United States Patent [19]

Mankey

[11] Patent Number: 4,907,935
[45] Date of Patent: Mar. 13, 1990

[54] CARGO TRANSPORTER

[75] Inventor: Harry S. Mankey, Dallas, Tex.

[73] Assignee: Standard Manufacturing Company, Inc., Dallas, Tex.

[21] Appl. No.: 128,781

[22] Filed: Dec. 4, 1987

[51] Int. Cl.⁴ .............................................. B64C 1/22
[52] U.S. Cl. .................................... 414/495; 414/541; 414/347; 414/471; 414/589; 244/137.1
[58] Field of Search ............... 414/495, 469, 471, 474, 414/477, 476, 486, 498, 589, 501, 546, 547, 557, 586, 549, 550, 671; 244/137.1

[56] References Cited

U.S. PATENT DOCUMENTS

| | | |
|---|---|---|
| 1,136,726 | 4/1915 | Shumway et al. . |
| 2,292,519 | 3/1960 | Taylor . |
| 2,449,863 | 9/1948 | Ross . |
| 2,480,916 | 9/1949 | Gibson . |
| 2,706,102 | 4/1955 | Cresci . |
| 2,741,901 | 5/1949 | Ross . |
| 2,838,191 | 6/1958 | Schramm .......................... 414/476 |
| 2,874,805 | 2/1959 | Jahnel . |
| 2,931,519 | 4/1960 | Beach . |
| 2,940,769 | 6/1960 | Taylor ........................... 414/495 X |
| 2,974,972 | 3/1961 | Hassell ........................... 414/495 X |
| 3,105,673 | 10/1963 | Williamson ........................... 254/8 |
| 3,145,865 | 8/1964 | Rogers ........................... 414/495 |
| 3,424,325 | 1/1969 | Kaltenegger ........................ 214/390 |
| 3,743,044 | 7/1973 | Scheele ........................... 414/495 X |
| 3,928,946 | 12/1975 | Wynn .................................. 51/109 |
| 4,180,366 | 12/1979 | Roth et al. ........................... 414/540 |
| 4,273,306 | 6/1981 | Chang .................................. 248/421 |
| 4,408,739 | 10/1983 | Buchsel ........................... 414/495 X |
| 4,526,346 | 7/1985 | Galloway et al. .................... 254/122 |
| 4,684,314 | 8/1987 | Luth ................................... 414/501 X |
| 4,752,179 | 6/1988 | Seaberg ........................... 414/671 X |
| 4,792,272 | 12/1988 | Oswald et al. .................... 414/495 X |

FOREIGN PATENT DOCUMENTS

| | | |
|---|---|---|
| 536376 | 3/1955 | Belgium . |
| 1114290 | 9/1961 | Fed. Rep. of Germany . |
| 2522896 | 9/1976 | Fed. Rep. of Germany ...... 414/546 |
| 2397303 | 3/1979 | France ............................ 414/471 |
| 503494 | 4/1976 | U.S.S.R. . |
| 527377 | 5/1977 | U.S.S.R. . |
| 846161 | 8/1960 | United Kingdom . |

Primary Examiner—Robert J. Spar
Assistant Examiner—Robert S. Katz
Attorney, Agent, or Firm—Michael A. O'Neil

[57] ABSTRACT

A cargo transporter having a cargo platform, mounted on a frame. The frame is supported by lift assemblies, which are mounted on wheel assemblies. Each lift assembly has a leg having an upper end which supports the frame and a lower end connected to the wheel assembly. Each lift assembly also has a support arm having an upper end pivotally connected to the frame and a lower end pivotally connected to the leg. Each lift assembly also has a hydraulic cylinder and piston rod, mounted between the leg and a bell crank of the support arm for changing the angle between the leg and the support arm, to cause the frame in the cargo platform to move vertically. A plurality of hydraulic cylinders and piston rods are mounted between the frame and the cargo platform for maneuvering the cargo platform relative to the frame.

11 Claims, 7 Drawing Sheets

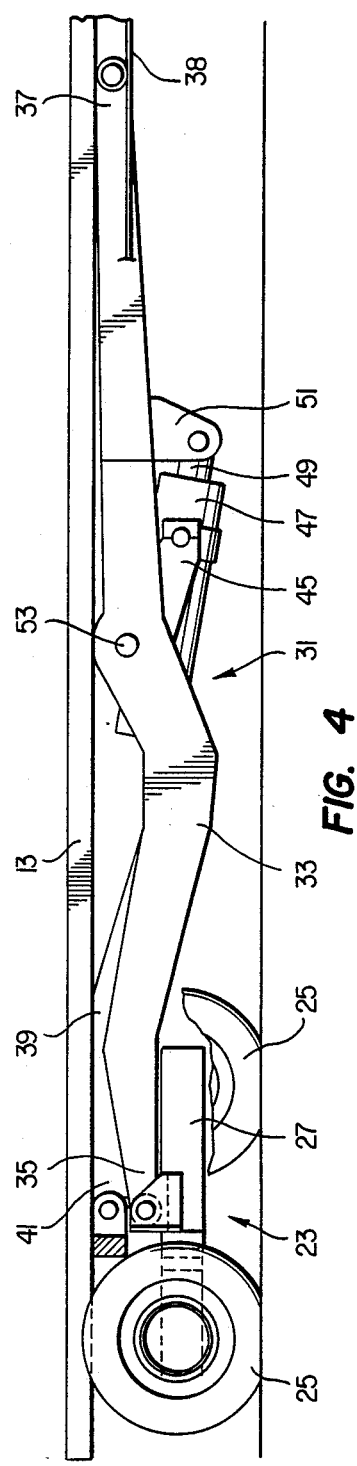
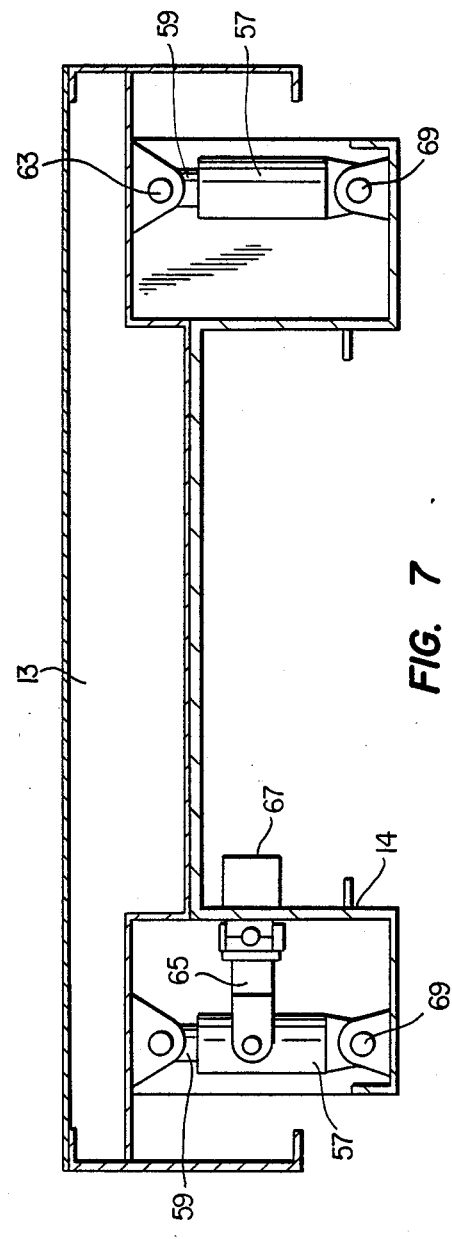

CARGO TRANSPORTER

TECHNICAL FIELD

This invention relates in general to an apparatus for handling material, and more particularly to a cargo transporter in which the height of the cargo carrying platform can be adjusted, so that the cargo can be loaded into an aircraft. The platform height adjusting mechanism also facilitates loading of the cargo transporter into an aircraft.

BACKGROUND AND SUMMARY OF THE INVENTION

Cargo is commonly transported from a loading dock to a waiting aircraft by a motorized cargo transporter. Typical cargo transporters have a flat cargo platform for receiving and transporting the cargo. The cargo is then moved from the cargo platform to the cargo deck of the aircraft. Obviously, it greatly facilitates the loading of the aircraft if the cargo platform and the cargo deck are at the same height.

The cargo decks on different types of aircraft are located at different heights above ground level. The heights of cargo decks range from eighteen and a half feet, on the Boeing 747, to thirty-nine inches on the C-130. Therefore, if a single cargo transporter is to be used with several different types of aircraft, the height of the cargo platform of the cargo transporter must be adjustable.

Cargo transporters typically have a frame with wheel assemblies at each end. A cargo platform is mounted on the frame, and lift assemblies are mounted between the frame and the cargo platform. The lift assemblies raise and lower the cargo platform relative to the frame of the transporter.

Some cargo transporter lift assemblies have a pair of scissor arms. Apparatus is provided for changing the angle between the scissor arms, in order to raise or lower the platform relative to the frame.

In many cases it is desirable to load the cargo transporter itself into an aircraft. Sometimes the ground clearance under the frame of the cargo transporter is insufficient to allow the transporter to get over the angle between the ramp and the cargo deck of the aircraft.

The present invention relates to a cargo transporter which overcomes the foregoing deficiencies long since associated with the prior art. The cargo transporter of the invention has a cargo platform mounted on a frame that is supported by two pairs of lift assemblies. Each lift assembly is in turn mounted on a wheel assembly. Importantly, neither the wheel assemblies nor the lift assemblies are interconnected by any sort of frame other than the cargo platform frame.

Each lift assembly has an elongated leg connected to the frame at one end and to a wheel assembly at the other end. A support arm is pivotally connected at one end to the frame end and is pivotally connected at the other end to the leg. Hydraulic cylinders are used to change the angles between the support arms and the legs in a scissor-like fashion. As the angles are changed, the upper ends of the legs slide horizontally along the frame, and the frame and the cargo platform are raised or lowered. The lift assemblies are located far enough apart so that the upper ends of the legs do not contact when the cargo platform is in the lowermost position.

The cargo platform is mounted on the frame by a set of hydraulic cylinders that allow the platform to be moved slightly relative to the frame. The platform can be moved laterally or longitudinally, tilted, or pivoted about a vertical axis. These movements allow the operator to make fine adjustments in the alignment between the platform and the cargo deck of the aircraft.

DESCRIPTION OF THE DRAWINGS

A more complete understanding of the invention may be had by reference to the following Detailed Description when taken in conjunction with the accompanying Drawings wherein:

FIG. 4 is a partial side view of a cargo transporter showing one of the lift assemblies in the lowermost position;

FIG. 7 is partial sectional view, as seen long lines VII—VII in FIG. 1; and

DETAILED DESCRIPTION

Figure 1:
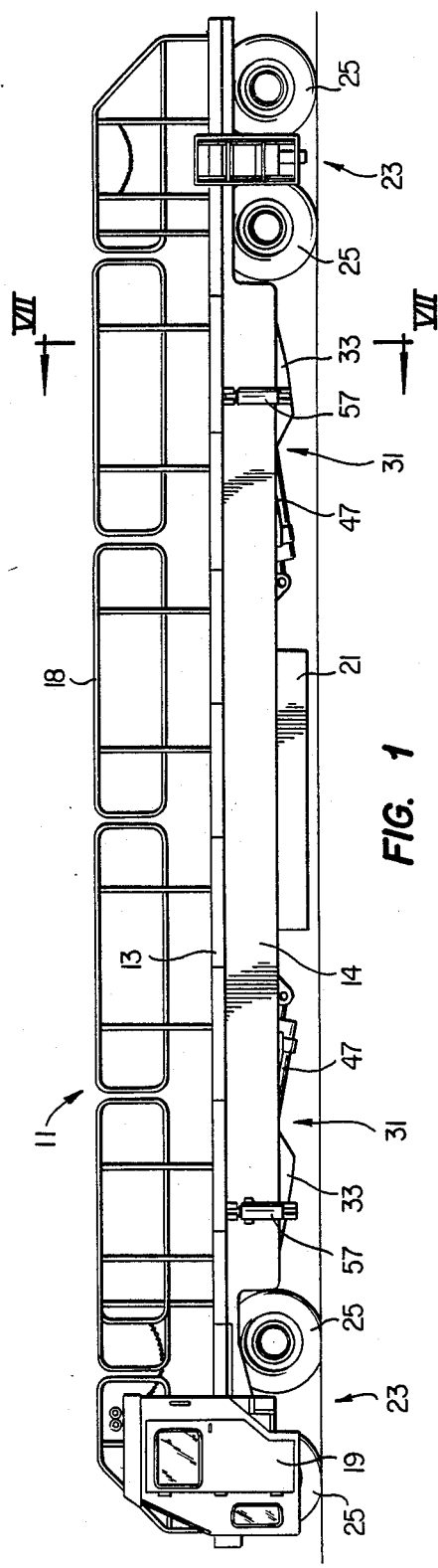
FIG. 1 is a side view of a cargo transporter incorporating the invention.
Figure 2:
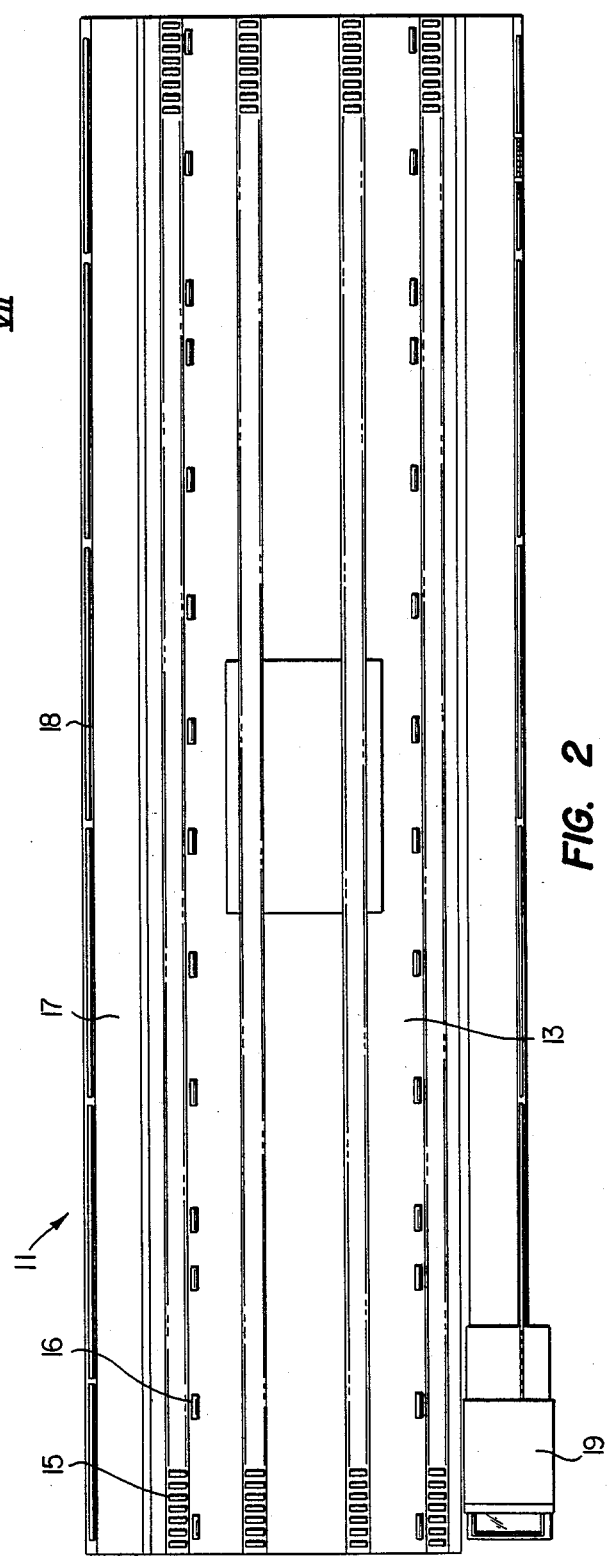
FIG. 2 is a top view of the cargo transporter.
Figure 3:
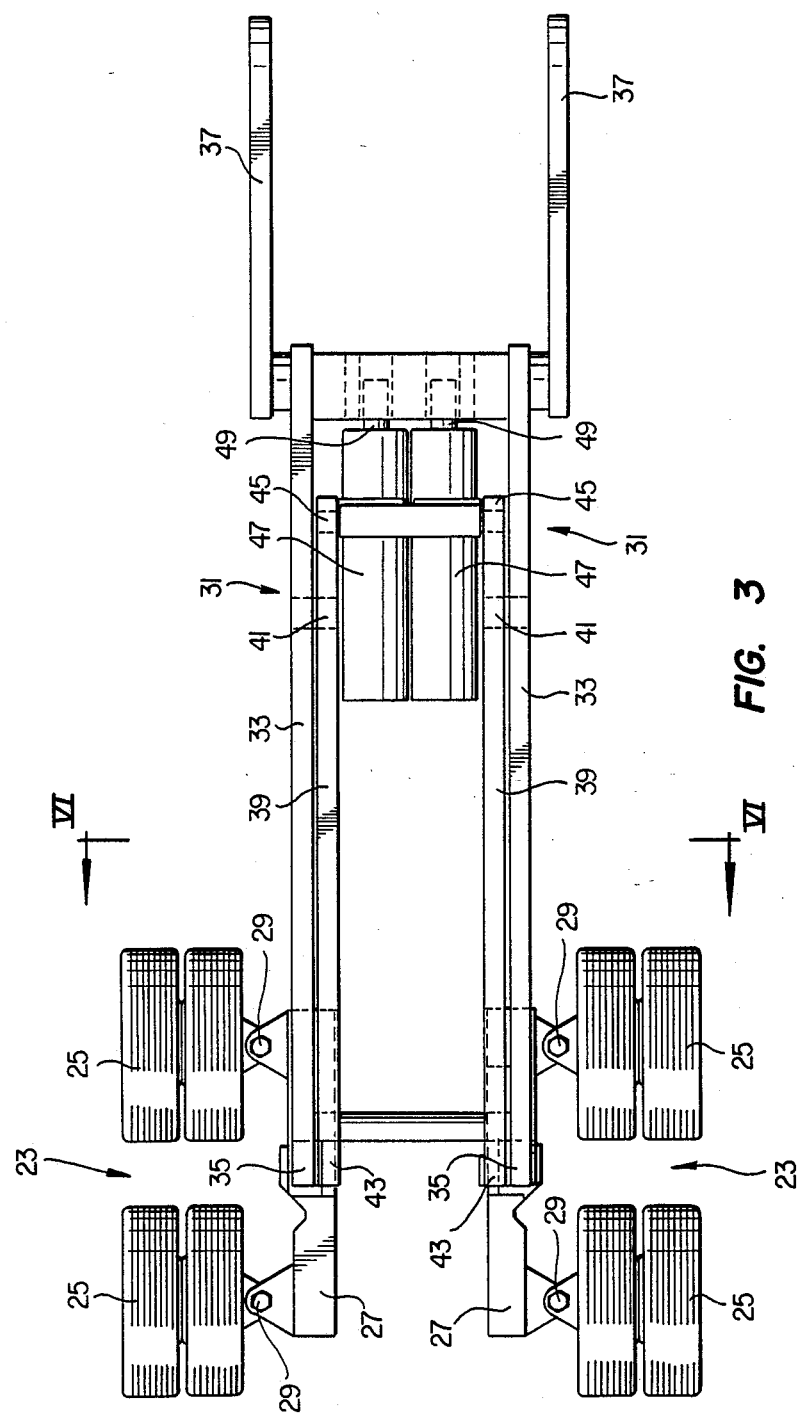
FIG. 3 is a partial top view of the cargo transporter showing one of the lift assemblies and two of the wheel assemblies.

As shown in FIGS. 1 and 2, the cargo transporter 11 of the invention has a flat, rectangular cargo platform 13, mounted on a frame 14. The cargo platform 13 is large enough to carry 5 cargo pallets, each of which is 88 inches by 108 inches. The platform 13 has four rows of aluminum support rollers 15 and two rows of rubber driving rollers 16 to facilitate movement of pallets across the platform 13.

Catwalks 17 and handrails 18 are located along each side of the cargo platform 13 to provide access to loaded cargo. The catwalks 17 and handrails 18 can be removed to reduce the width of the transporter 11.

A cab 19 is mounted on the front, left-hand side of the transporter 11. The cab 19 can be moved fore and aft a total of twenty-six inches. The cab 19 can also be pivoted to the front of the transporter 11, in order to reduce the width of the transporter 11. When the cab 19 is in front of the transporter 11, and the catwalks 17 and handrails 18 have been removed, the transporter 11 is narrow enough to be loaded onto an aircraft.

The cargo transporter 11 is powered by an engine 21, which is located beneath the cargo platform 13. The engine 21 is mounted near the midpoint of the cargo frame 14, in order to evenly distribute the weight.

The transporter 11 has four wheel assemblies 23. Each wheel assembly 23 consists of two pairs of wheels 25 mounted on a walking beam suspension 27. The transporter 11 is steered by turning each pair of wheels 25 about the connection point 29 between the wheels 25 and the walking beam suspension 27. All four wheel assemblies 23 are steerable.

As shown in FIGS. 3-6, the frame 14 is supported by two lift assemblies 31, which are mounted on the four wheel assemblies 23. Each lift assembly 31 has a pair of elongated legs 33. The lower end 35 of each leg 33 is pivotably mounted on one of the walking beams 27 to form a Y-shaped lift assembly. The pivotable connection 36 between the leg 33 and the walking beam suspension 27 maintains an equal weight distribution on each wheel 25.

The upper ends 37 of the legs 33 support the frame 14. As shown in FIG. 4, the upper end 37 of each leg 33 is housed within one of two elongated channels 38, which extend along the length of the frame 14. The upper ends 37 of the legs 33 slide horizontally along the channels 38 in the direction shown by arrows 40. When the lift assemblies 31 are in the lowermost position, the upper ends 37 of the legs 33 are near the midpoint of the frame 14, but do not contact the ends 37 of the legs 33 at the other end of the transporter 11.

A support arm 39 is mounted between the frame 14 and each leg 33. The upper end 41 of the support arm 39 is pivotably connected to the frame 14 at 12, and the lower portion 43 of the support arm 39 is pivotally connected to the leg 33. Each support arm 39 has an extension 45 that protrudes beyond leg 33 at an angle to form arm 39 as a bellcrank 43.

A hydraulic cylinder 47 is pivotally connected at 48 to each extension 45. The piston rod 49 from each hydraulic cylinder 47 is pivotably connected to a plate 51, which is rigidly connected to the leg 33. The two hydraulic cylinders 47 at each end of the transporter 11 are connected together. Each cylinder 47 alone is large enough to hold the lift assembly 31, in case one of the cylinders 47 fails. Further, a counterbalance valve within the hydraulic line will hold the cylinder 47 if a hydraulic line fails. U.S. Pat. No. 4,625,944 (Mankey et al.), issued Dec. 2, 1986, is hereby incorporated by reference.

Figure 5:
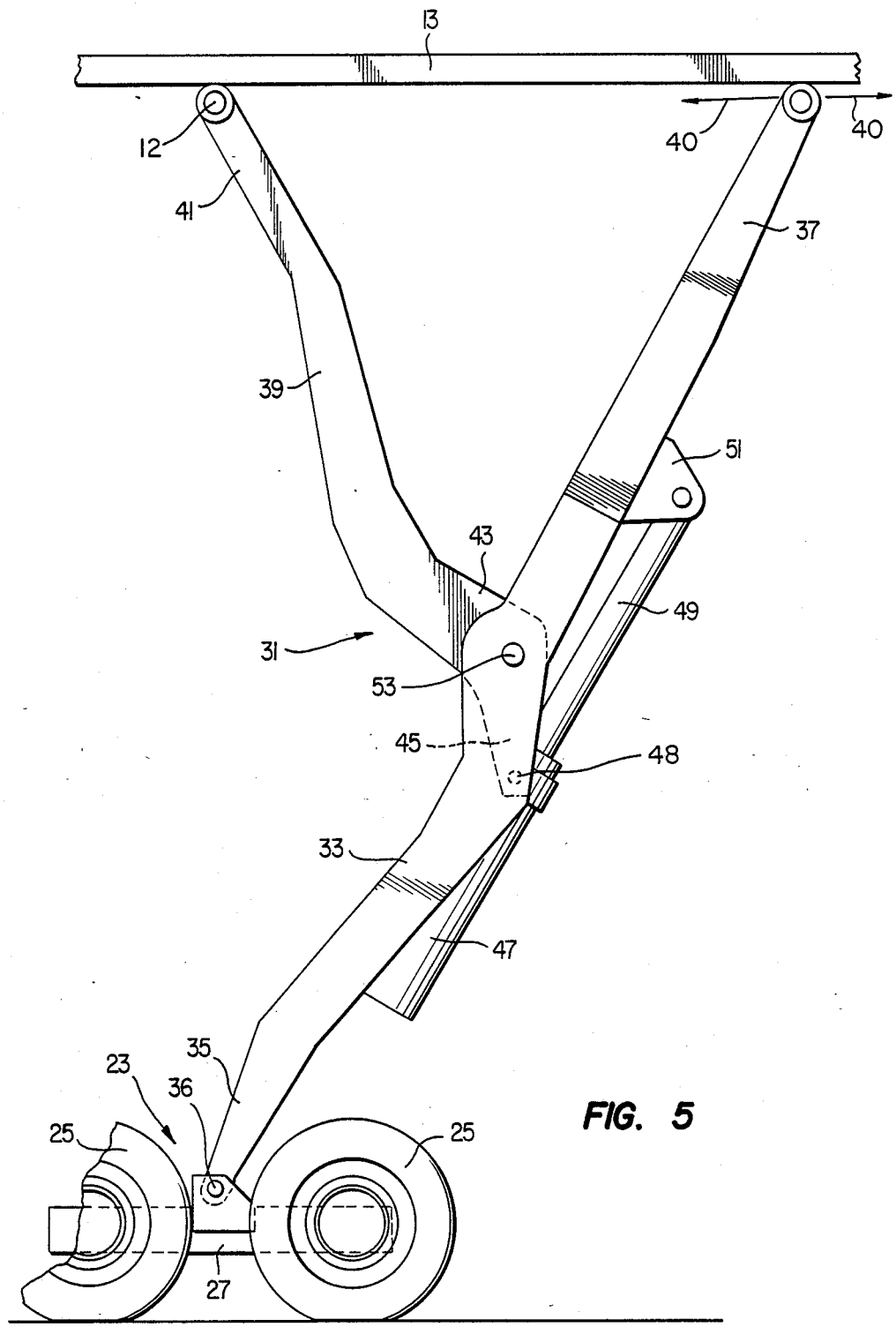
FIG. 5 is a partial side view of a cargo transporter showing one of the lift assemblies in the uppermost position.
Figure 6:
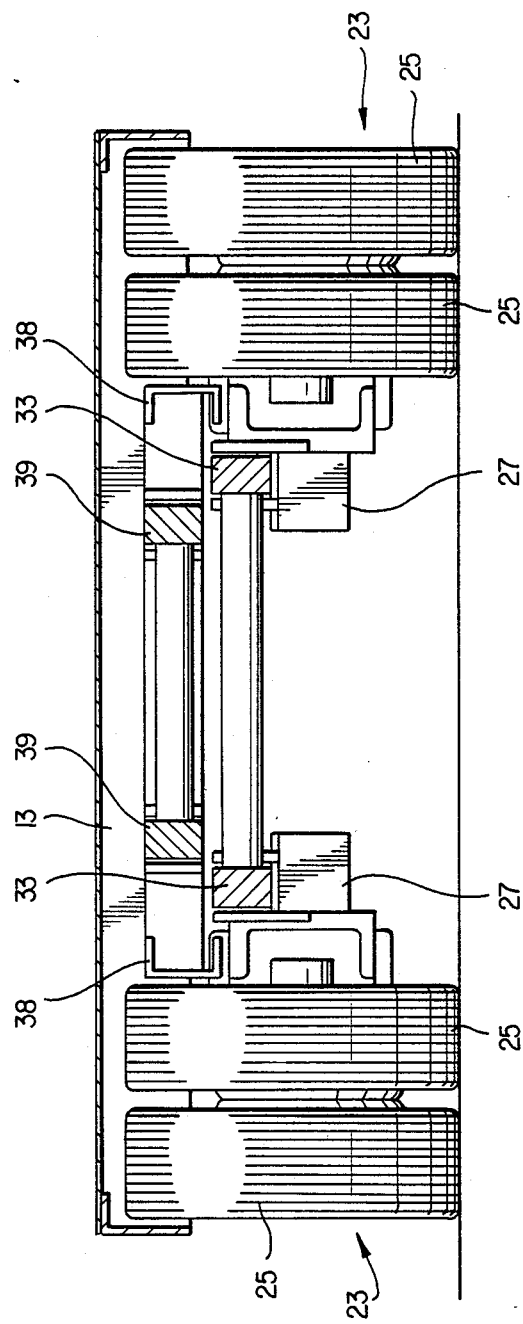
FIG. 6 is a sectional view, as seen along lines VI—VI in FIG. 1.

As shown in FIGS. 4 and 5, when the piston rod 49 is extended from the hydraulic cylinder 47, the extension 45 is rotated about the connection point 53 between the support arm 39 and the leg 33. The extension and retraction of the piston rod 49 thus changes the angle between the support arm 39 and the leg 33. The leg 33 and support arm 39 thus move toward and away from each other in a scissor-like movement.

The connection point 53 between the leg 33 and the support arm 39 is equidistant from the lower end 35 of the leg 33, the upper end 37 of the leg 33, and the upper end 41 of the support arm 39. Therefore, when all of the pistons 49 are extended (or retracted) together, the upper ends 41 of the support arms 39 move vertically upward (or vertically downward). Each leg 33 rotates about its pivot connection 36, as the upper end 37 of the leg 33 slides horizontally along the frame 14. The upper ends 37 of the legs 33 are always at the same height as the upper ends 41 of the support arms 39, and the cargo platform 13 and the frame 14 are kept horizontal.

If desired, the two lift assemblies 31 at one end of the transporter 11 can be independently and selectively raised to a different level from the lift assemblies 31 at the other end. The cargo platform 13 and the frame 14 can thus be tilted forwards or backwards.

FIG. 7 shows a sectional view of the cargo platform 13 and the frame 14. The cargo platform 13 is supported by four vertical hydraulic cylinders 57. The piston rods 59 of the vertical hydraulic cylinders 57 are pivotally connected to the platform 13. The hydraulic cylinders 57 are pivotally connected to the frame 14. Thus, when the piston rods 59 are extended from the hydraulic cylinders 57, the cargo platform 13 is raised relative to the frame 14. If only the two piston rods 59 on the left side of the cargo transporter 11 are extended, the cargo platform 13 is tilted about a horizontal axis 63 through the connections between the cargo platform 13 and the piston rods 59 on the right side of the frame 14. The platform 13 can be tilted up to four degrees. Thus the front, back and sides of the platform 13 may be selectively and independently raised and lowered with respect to the frame 14.

The cargo platform 13 can also be moved up to three inches to the left or right. The two vertical hydraulic cylinders 57 on the left side of the cargo transporter 11 are connected to piston rods 65, which extend horizontally from hydraulic cylinders 67 attached to the frame 14. When the piston rods 65 are extended, the vertical hydraulic cylinders 57 rotate about axis 69 through the connections between the vertical hydraulic cylinders 57 and the frame 14. As the vertical hydraulic cylinders 57 rotate, the cargo platform 13 is moved left or right. If both of the piston rods 65 are extended, the cargo platform 13 is moved to the left. If both of the piston rods 65 are retracted, the cargo platform 13 is moved to the right. If one of the piston rods 65 is extended, and the other piston rod 65 is retracted, the cargo platform 13 is rotated in one direction or the other about a vertical axis.

In the normal driving configuration of the cargo transporter 11, the frame 14 is located about eighteen inches above the lowermost position. This configuration provides sufficient clearance between the wheels 25 and the frame 14 to allow the wheels 25 to be turned.

In use, the transporter 11 is driven up to the aircraft and placed in a position at which the front of the transporter 11 is located near the door of the airplane's cargo bay. The cargo platform 13 and the frame 14 are then raised or lowered to the level of the airplane's cargo deck, by applying hydraulic fluid to the hydraulic cylinders 47 to extend or retract the piston rods 49.

Extending the piston rods 49 will raise the frame 14. As the piston rods 49 are extended, the plates 51 are moved relative to the extensions 45. This causes the legs 33 and the arms 39 to rotate with respect to one another. The upper ends 37 of the legs 33 slide along the channels 38, and the lower ends 35 of the legs 33 rotate about the pivot connections 36. The support arms 39 rotate about their upper ends 41, as the upper ends 41 move vertically upward.

The frame 14 is thus moved upward or downward until the frame 14 is approximately the same level as the cargo deck on the airplane. Hydraulic power can then be applied to the vertical and horizontal hydraulic cylinders 57 and 67 to maneuver the cargo platform 13. By use of the hydraulic cylinders 57 and 67, the cargo platform 13 can be maneuvered into precise alignment with the cargo deck of the airplane.

Figure 8:
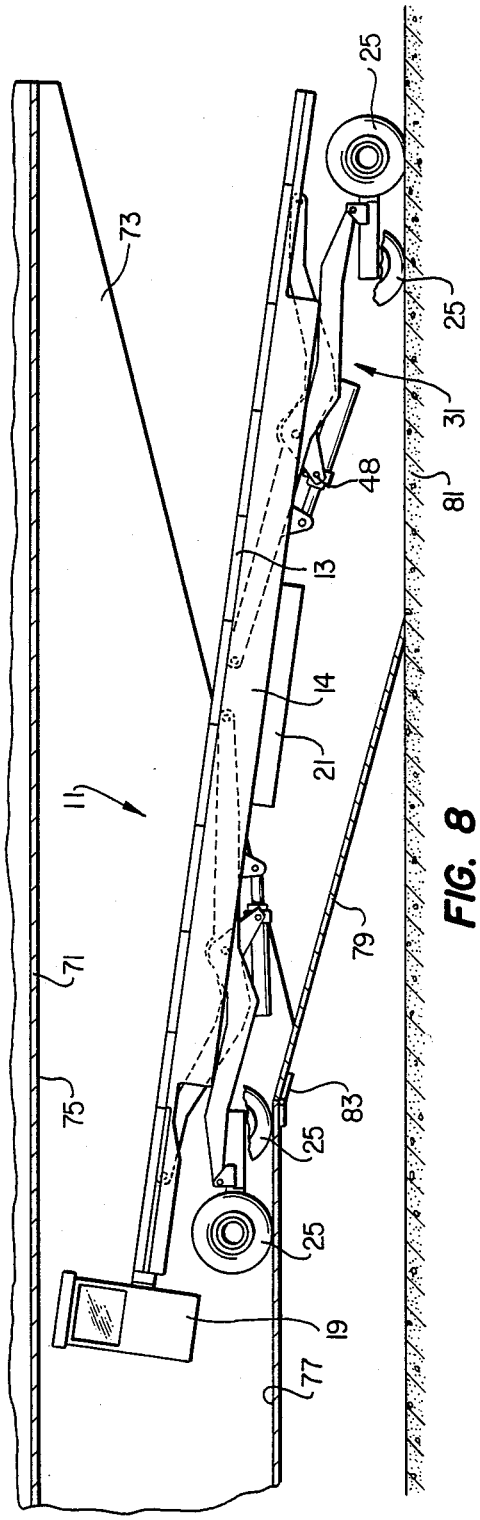
FIGS. 8-10 is a sequence of side views illustrating a cargo transporter of the invention being loaded into an aircraft.
Figure 9:
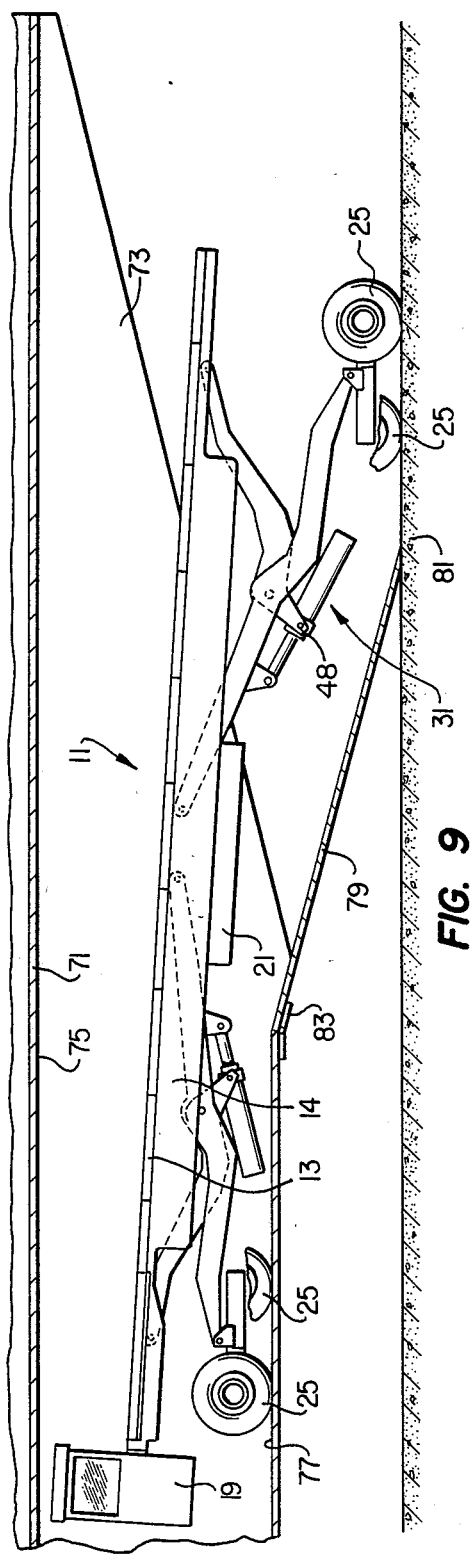
Figure 10:
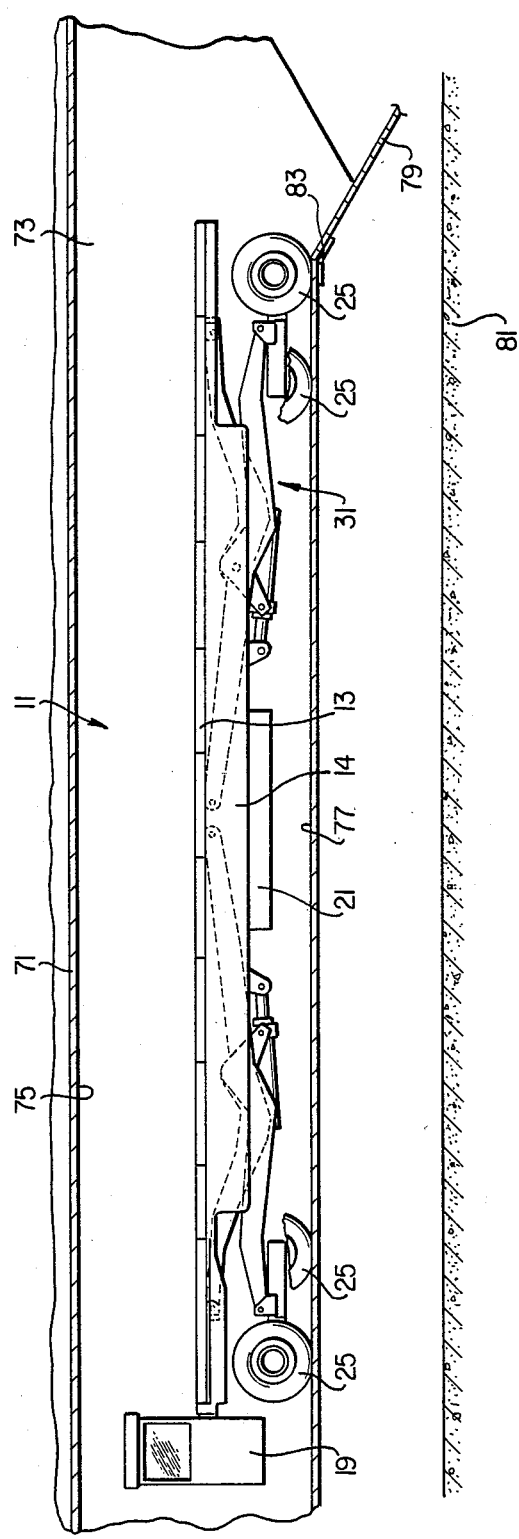

FIGS. 8-10 show the loading of a cargo transporter 11 onto an aircraft 71. The particular aircraft 71 illustrated is a C-130 airplane, although the transporter 11 may be loaded onto many different types of aircraft.

The C-130 aircraft 71 has a cargo compartment 73, which has a horizontal ceiling 75 and a horizontal floor 77. The aircraft 71 also has a loading ramp 79 which extends downward from the aircraft floor 77 to the ground 81.

Prior to loading, the handrails 18 are removed from the transporter 11, and the cab 19 is pivoted to the front of the transporter 11. This makes the transporter 11 low enough and narrow enough to fit within the cargo compartment 73.

The transporter 11 is then driven up the ramp 79 until the front wheels 25 are on the floor 77 of the cargo compartment 73 and the rear wheels 25 are still on the ground. This position is shown in FIG. 8. Continued forward movement of the transporter 11 would cause the engine 21 to impact on the ridge 83 where the ramp 79 and the floor 77 intersect. Instead, the rear lift assembly 31 is activated to raise the rear end of the cargo platform 13 and the frame 14. This position is shown in FIG. 9.

The transporter 11 can then be driven the rest of the way into the cargo compartment 73. As the rear wheels 25 move up the ramp 79, the rear lift assembly 31 gradually retracts to keep the cargo platform 13 from hitting the ceiling 75 of the cargo compartment 73. When the rear wheels 25 reach the floor 77, as shown in FIG. 10, the rear lift assembly 31 has returned to its lowermost position.

The cargo transporter 11 of the invention has several significant advantages over the prior art. When the cargo platform 13 is in the raised position, the frame 14 is also in the raised position. Thus, there is no frame or other structure between either the wheel assemblies 23 or the lift assemblies 31 to contact the ridge 83 between the ramp 79 and the floor 77 of the cargo compartment 73 when the transporter 11 is loaded onto an aircraft 71. The invention also provides a novel means for fine adjustment of the position of the cargo platform 13 relative to the cargo deck of the aircraft.

The invention has been shown only in the preferred embodiment. It should be apparent to those skilled in the art that the invention is not so limited, but is susceptible to various changes and modifications without departing from the substance of the invention.

I claim:

1. A cargo transporter comprising:
   a frame;
   a cargo platform mounted on the frame;
   front and rear wheel assemblies;
   rigid front and rear legs having upper ends that support the frame and lower ends that are connected to the wheel assemblies;
   a plurality of support arms, each of which has an upper end pivotally connected to the frame and a lower end, there being a pivotal connection between each leg and a corresponding arm intermediate the said arm upper and lower ends to form front and rear lift assemblies, the lower end of said arm extending beyond said pivot connection in an angled direction so as to form a bellcrank configuration; and
   means coupled between each leg and connecting support arm extension for independently and selectively changing the angles between the legs and the corresponding support arms of the front and rear lift assemblies to cause the frame and the cargo platform to move vertically.

2. A cargo transporter, as recited in claim 1, wherein the means for changing the angles between the legs and the support arms further comprises
   a hydraulic cylinder and piston rod.

3. A cargo transporter, as recited in claim 2, wherein the upper ends of the legs slide through channels along the length of the frame.

4. A cargo transporter, as recited in claim 3, wherein the connection points between the legs and the support arms are equidistant from the lower end of the leg, the upper end of the leg, and the upper end of the support arm.

5. A cargo transporter comprising:
   a frame;
   a cargo platform;
   a plurality of independently operable hydraulic cylinders and piston rods, mounted between the frame and the cargo platform, for independently and selectively maneuvering the cargo platform vertically and laterally relative to the frame;
   a plurality of wheel assemblies;
   a plurality of rigid legs having upper ends which support the frame and lower ends connected to the wheel assemblies;
   a plurality of support arms having upper ends pivotally connected to the frame and lower ends pivotally connected to the legs; and
   means for independently changing the angles between each leg and a corresponding support arm to cause the frame and the cargo platform to move vertically.

6. A cargo transporter, as recited in claim 5, wherein the means for changing the angles between the legs and the support arms further comprises
   a hydraulic cylinder and piston rod mounted between each leg and its corresponding support arm for selectively causing movement of said leg toward and away from the support arm; each of said arms being bellcrank shaped.

7. A cargo transporter, as recited in claim 6, wherein the upper ends of the legs slide through channels along the length of the frame.

8. A cargo transporter, as recited in claim 7, wherein the connection points between the legs and the support arms are equidistant from the lower end of the leg, the upper end of the leg, and the upper end of the support arm.

9. A cargo transporter, as recited in claim 5, wherein the plurality of hydraulic cylinders and piston rods between the cargo platform and the frame include vertical cylinders and pistons for selectively and independently raising and lowering the front, back and sides of the cargo platform.

10. A cargo transporter, as recited in claim 9, wherein the plurality of hydraulic cylinders and piston rods further include horizontal cylinders and pistons for moving the platform laterally relative to the frame.

11. A cargo transporter comprising:
    a frame;
    a cargo platform supported on the frame;
    first and second lift assemblies connected to the frame at opposite ends thereof for selective and independent actuation to raise and lower the frame and the cargo platform and being interconnected solely by the frame; each lift assembly including a rigid leg having an upper end slidably supporting said frame and a pivotally attached support arm pivotally supporting said frame and forming a Y-shaped assembly;
    means coupled between the rigid leg and pivotally attached support arm of each Y-shaped assembly for causing selective and independent scissor-like movement of said leg and pivotally attached support arm toward and away from each other to raise and lower the frame; and
    first and second wheel assemblies connected to and supporting the lower end of the rigid legs of the first and second lift assemblies, respectively, for movement over an underlying surface and being interconnected solely by the lift assemblies and the frame.

* * * * *